United States Patent
Kimura

(10) Patent No.: US 12,438,185 B2
(45) Date of Patent: Oct. 7, 2025

(54) SULFIDE-BASED SOLID ELECTROLYTE AND ALL-SOLID LITHIUM ION BATTERY

(71) Applicant: JX NIPPON MINING & METALS CORPORATION, Tokyo (JP)

(72) Inventor: Makoto Kimura, Kitaibaraki (JP)

(73) Assignee: JX ADVANCED METALS CORPORATION, Tokyo (JP)

( * ) Notice: Subject to any disclaimer, the term of this patent is extended or adjusted under 35 U.S.C. 154(b) by 443 days.

(21) Appl. No.: 17/925,206

(22) PCT Filed: Apr. 12, 2021

(86) PCT No.: PCT/JP2021/015220
§ 371 (c)(1),
(2) Date: Nov. 14, 2022

(87) PCT Pub. No.: WO2022/064744
PCT Pub. Date: Mar. 31, 2022

(65) Prior Publication Data
US 2023/0198006 A1    Jun. 22, 2023

(30) Foreign Application Priority Data
Sep. 24, 2020 (JP) ................. 2020-160154

(51) Int. Cl.
*H01M 10/0562* (2010.01)
*H01M 10/0525* (2010.01)

(52) U.S. Cl.
CPC ... *H01M 10/0562* (2013.01); *H01M 10/0525* (2013.01); *H01M 2300/0068* (2013.01)

(58) Field of Classification Search
CPC ............................................... H01M 10/0562
See application file for complete search history.

(56) References Cited

U.S. PATENT DOCUMENTS

| | | |
|---|---|---|
| 10,541,443 B2 | 1/2020 | Kanno et al. |
| 2019/0221884 A1 | 7/2019 | Utsuno et al. |
| 2019/0260065 A1 | 8/2019 | Yashiro et al. |
| 2020/0185768 A1* | 6/2020 | Kang .................. H01M 10/052 |

FOREIGN PATENT DOCUMENTS

| | | | |
|---|---|---|---|
| EP | 3 499 629 A1 | 6/2019 | |
| JP | 2018-29058 A | 2/2018 | |
| KR | 20180099548 A | * | 9/2018 |
| WO | WO 2017/007030 A1 | 1/2017 | |

OTHER PUBLICATIONS

Extended European Search Report for corresponding European Application No. 21871880.7, dated Apr. 26, 2024.
International Search Report for PCT/JP2021/015220 (PCT/ISA/210) mailed on Jun. 29, 2021.
Zhang et al., "Design and synthesis of room temperature stable Li-argyrodite superionic conductors via cation doping", Journal of Materials Chemistry A, 2019, vol. 7, pp. 2717-2722.

* cited by examiner

*Primary Examiner* — Brian R Ohara
(74) *Attorney, Agent, or Firm* — Birch, Stewart, Kolasch & Birch, LLP

(57) ABSTRACT

Provided are sulfide-based solid electrolyte with good ionic conductivity and an all-solid lithium ion battery using the same. A sulfide-based solid electrolyte having an argyrodite-type structure, wherein a composition of the sulfide-based solid electrolyte is represented by the formula:

$$Li_8GeS_{5-x}Te_{1+x}$$

in which: $-0.5 \leq x < 0$, $0 < x \leq 0.375$.

4 Claims, 2 Drawing Sheets

SULFIDE-BASED SOLID ELECTROLYTE AND ALL-SOLID LITHIUM ION BATTERY

FIELD OF THE INVENTION

The present invention relates to a sulfide-based solid electrolyte and an all-solid lithium ion battery.

BACKGROUND OF THE INVENTION

With rapidly spreading of information relational devices and communication devices such as personal computers, video cameras, and mobile phones in recent years, development of batteries used as their power sources has been emphasized. Among the batteries, lithium ion batteries are attracting attention in terms of high energy density. Further, the high energy density and improvement of battery characteristics are also required for lithium secondary batteries for large-scale applications such as on-board power sources and road leveling.

However, for the lithium ion batteries, most of the electrolytes are organic compounds, and even if a flame-retardant compound is used, any risk of causing a fire could not be completely eliminated. As an alternative candidate for such liquid-type lithium ion batteries, all-solid lithium ion batteries having a solid electrolyte have been attracting attention in recent years. Among others, an all-solid lithium ion battery containing a sulfide such as $Li_2S$—$P_2S_5$ or the sulfide to which a lithium halide is added, as a solid electrolyte, is becoming mainstream.

Further, solid electrolytes with high ionic conductivity are required to improve the characteristics of all-solid lithium ion batteries. In general, by increasing lithium ions which are charge carriers, the improvement of lithium ion conductivity can be expected. As such a technique, for example, Non-Patent Literature 1 discloses a technique of substituting pentavalent P in argyrodite-type $Li_7PS_6$ with tetravalent Ge.

CITATION LIST

Non-Patent Literature

[Non-Patent Literature] J. Mater. Chem. A, 7 (2019) 2717.

SUMMARY OF THE INVENTION

When an amount of pentavalent P in the sulfide-based solid electrolyte substituted with a tetravalent element is increased, the ionic conductivity is accordingly improved. In this regard, the technique described in Non-Patent Literature 1 as described above substitutes the pentavalent P in the argyrodite-type $Li_7PS_6$ with tetravalent Ge, but only 35% of P is substituted, which cannot be completely substituted. Therefore, there is still room for improvement of the ionic conductivity of the sulfide-based solid electrolytes. An object of an embodiment of the present invention is to provide a sulfide-based solid electrolyte with good ionic conductivity and an all-solid lithium ion battery using the same.

As a result of various studies, the present inventors have found that, by modifying a lithium ion conductor having an argyrodite-type structure to a structure containing tellurium (Te), 100% of phosphorus (P) can be substituted with germanium (Ge), thereby improving the ionic conductivity. Then, the present inventors have found that the above problems can be solved by a sulfide-based solid electrolyte having an argyrodite-type structure and having a predetermined composition.

In an embodiment, the present invention that has been completed based on the above findings relates to a sulfide-based solid electrolyte having an argyrodite-type structure, wherein a composition of the sulfide-based solid electrolyte is represented by the formula:

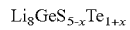

$Li_8GeS_{5-x}Te_{1+x}$ in which: $-0.5 \leq x < 0$, $0 < x \leq 0.375$.

In another embodiment, the sulfide-based solid electrolyte according the present invention satisfies $-0.375 \leq x < 0$ in the above formula.

In still another embodiment, the present invention relates to an all-solid lithium ion battery comprising: a solid electrolyte layer made of the sulfide-based solid electrolyte according to the embodiment of the present invention; a positive electrode layer; and a negative electrode layer.

According to the present invention, it is possible to provide a sulfide-based solid electrolyte with good ionic conductivity and an all-solid lithium ion battery using the same.

Figure 1:
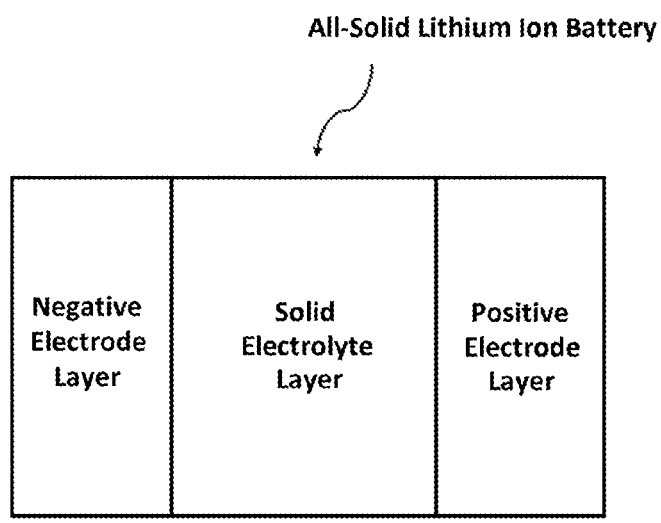
FIG. 1 is a schematic view of an all-solid lithium ion battery according to an embodiment of the present invention.

DETAILED DESCRIPTION OF THE INVENTION (Sulfide-Based Solid Electrolyte)

The sulfide-based solid electrolyte according to this embodiment is a sulfide-based solid electrolyte having an argyrodite-type structure. It can be confirmed by, for example, X-ray diffraction measurement using CuKα rays that the sulfide-based solid electrolyte has the argyrodite-type structure. The argyrodite-type structure has strong diffraction peaks at 2θ=24.3±1.0° and 28.7±1.0°. The diffraction peaks of the argyrodite-type structure may also appear at, for example, 2θ=14.8±1.0°, 17.2±1.0°, 30.0±1.0°, 42.9±1.0° or 45.6±1.0°. The sulfide-based solid electrolyte according to the present embodiment may have these peaks.

The sulfide-based solid electrolyte according to the present embodiment may partially contain an amorphous component(s) as long as it has the X-ray diffraction pattern of the argyrodite-type structure.

The composition of the sulfide-based solid electrolyte according to this embodiment is represented by the formula: $Li_8GeS_{5-x}Te_{1+x}$ in which: $-0.5 \leq x < 0$, $0 < x \leq 0.375$. In the sulfide-based solid electrolyte according to the present embodiment, sulfur (S) in the solid electrolyte is substituted with Te having a larger ionic radius, so that the stability of the crystal structure is increased, and complete (100%) phosphorus (P) is substituted with germanium (Ge). According to such a structure, an substituting amount of germanium (Ge) is increased, so that the sulfide-based solid electrolyte having good ionic conductivity can be obtained.

In the sulfide-based solid electrolyte according to the present embodiment, x of less than −0.5 in the above compositional formula may generate a $Li_4GeS_4$ phase with lower ion conductivity. On the other hand, x of more than 0.375 results in a large crystal lattice, so that a distance between Li sites may become long, and the ionic conductivity may decrease. The sulfide-based solid electrolyte according to the present embodiment preferably satisfies $-0.375 \leq x < 0$ in the above compositional formula. According to such a composition, the sulfide-based solid electrolyte having better ionic conductivity can be obtained. Such good ion conductivity of the sulfide-based solid electrolyte results in a decreased voltage drop (IR drop) during discharge, so that the battery capacity of the all-solid lithium ion battery using it can be increased. Further, this effect becomes remarkable especially when the all-solid lithium ion battery has a high rate. In the above formula, "$-0.5 \leq x < 0$, $0 < x \leq 0.375$" means $-0.5 \leq x < 0$, or $0 < x \leq 0.375$.

The average particle diameter of the sulfide-based solid electrolyte according to the embodiment of the present invention is not particularly limited, but it may be 0.01 to 100 µm, or 0.1 to 100 µm, or 0.1 to 50 µm.

The ion conductivity of the sulfide-based solid electrolyte according to the embodiment of the present invention is preferably $10^{-4}$ S/cm or more, and more preferably $10^{-3}$ S/cm or more. The ionic conductivity of the sulfide-based solid electrolyte is determined by, for example, pressing 0.2 g of sulfide-based solid electrolyte powder at a pressure of 550 MPa to form a plate, and then preparing a pellet having a diameter of 10 mm, which has attached gold electrodes to both sides of the plate, and carrying out AC impedance measurement from 1 Hz to 10 MHz at 25° C.

(Method for Producing Sulfide-Based Solid Electrolyte)

Next, a method for producing a sulfide-based solid electrolyte according to an embodiment of the present invention will be described.

First, raw materials are weighed so as to have a predetermined composition in a glove box having an inert gas atmosphere such as an argon gas or a nitrogen gas. Examples of the raw materials used herein include Li, $Li_2S$, $Li_2Te$, $LiTe_3$, Ge, GeS, $GeS_2$, GeTe, S, and Te.

These are then mixed for 5 to 30 minutes using a mortar or the like to prepare a mixed powder. At this time, it is preferable to mix them for a period of time such that an average particle diameter of the mixed powder is 5 to 40 µm.

The mixed powder can be then formed into pellets, sealed in quartz ampoules in vacuum, and fired for each quartz ampoule at 400 to 800° C. for 1 to 20 hours to prepare the sulfide-based solid electrolyte in which the composition is represented by the formula: $Li_8GeS_{5-x}Te_{1+x}$ in which: $-0.5 \leq x < 0$, $0 < x \leq 0.375$.

(All-Solid Lithium Ion Battery)

The solid electrolyte layer can be formed from the sulfide-based solid electrolyte according to the embodiment of the present invention, and an all-solid lithium ion battery including the solid electrolyte layer, a positive electrode layer, and a negative electrode layer can be produced. The positive electrode layer and negative electrode layer that form the all-solid lithium ion battery according to the embodiment of the present invention are not particularly limited, but they may be formed of known materials, and may have known structures as shown in FIG. 1.

The positive electrode layer of the lithium ion battery is obtained by forming a positive electrode mixture into a layer, which is obtained by mixing a known positive electrode active material for lithium ion batteries and the sulfide-based solid electrolyte according to the embodiment of the present invention or other sulfide-based solid electrolyte. The positive electrode mixture may further contain a conductive aid. The conductive aid that can be used herein include carbon materials, metal materials, or mixtures thereof. The conductive aid may contain at least one element selected from the group consisting of, for example, carbon, nickel, copper, aluminum, indium, silver, cobalt, magnesium, lithium, chromium, gold, ruthenium, platinum, beryllium, iridium, molybdenum, niobium, osmium, rhodium, tungsten and zinc. The conductive aid is preferably a highly conductive carbon single substance, a metal simple substance, a mixture or a compound including carbon, nickel, copper, silver, cobalt, magnesium, lithium, ruthenium, gold, platinum, niobium, osmium or rhodium. Examples of the carbon material that can be used herein include carbon black such as Ketjen black, acetylene black, Denka black, thermal black and channel black, graphite, carbon fiber, activated carbon and the like.

The negative electrode layer of the lithium ion battery may be obtained by forming a known negative electrode active material for lithium ion batteries into a layer. Further, the negative electrode layer may be obtained by forming a negative electrode mixture into a layer, which is obtained by mixing a known negative electrode active material for lithium ion batteries with the sulfide-based solid electrolyte according to the embodiment of the present invention or other sulfide-based solid electrolyte. As with the positive electrode layer, the negative electrode layer may contain a conductive aid. The conductive aid may employ the same material as that described for the positive electrode layer. Examples of the negative electrode active material that can be used herein include carbon materials, more particularly, artificial graphite, graphite carbon fiber, resin baked carbon, pyrolytic vapor grown carbon, coke, mesocarbon microbeads (MCMB), furfuryl alcohol resin baked carbon, polyacene, pitch-based carbon fiber, vapor grown carbon fiber, natural graphite, hardly graphitizable carbon, and the like, or a mixture thereof. The negative electrode material may employ, for example, a metal itself such as metallic lithium, metallic indium, metallic aluminum, and metallic silicon, or an alloy combined with other elements or compounds.

EXAMPLES

Hereinafter, Examples are provided for better understanding of the present invention and its advantages, but the present invention is not limited to these Examples.

Example 1

Raw materials were weighed so as to have a predetermined composition in a glove box having an argon atmosphere, and mixed for 15 minutes using a mortar to prepare a mixed powder. The mixed powder was then formed into 1 g of pellet, sealed in quartz ampoules in vacuum, and fired for each quartz ampoule at 700° C. for 8 hours to obtain a sulfide-based solid electrolyte having a composition of $Li_8GeS_{5.5}Te_{0.5}$.

0.2 g of the sulfide-based solid electrolyte powder was pressed at a pressure of 550 MPa to form a plate, and a pellet having a diameter of 10 mm, which attached gold electrodes to both sides of the plate, was then prepared, and AC impedance measurements were performed from 1 to 10 MHz at 25° C. to determine ionic conductivity.

Figure 2:
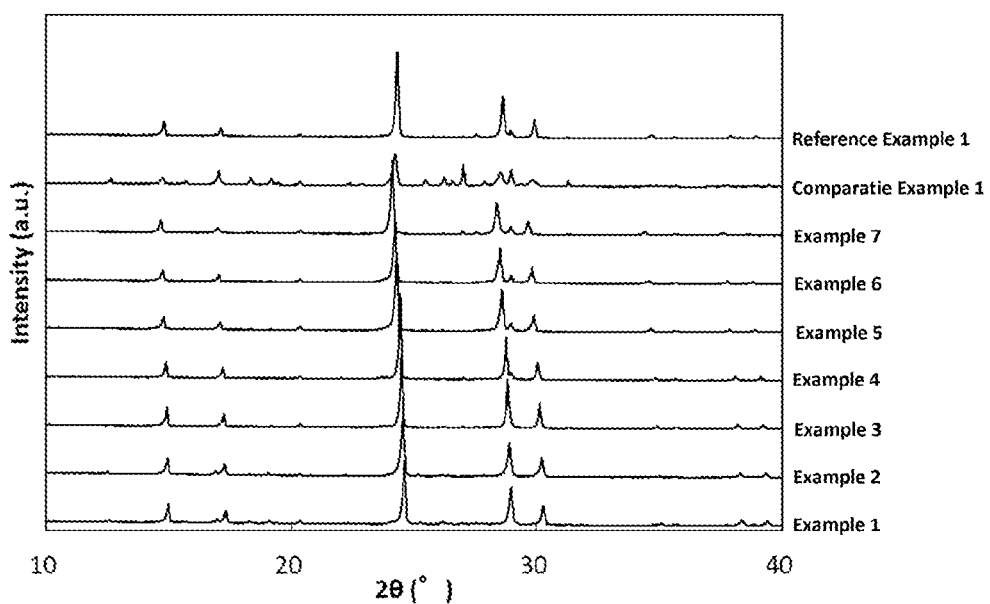
FIG. 2 is X-ray diffraction (XRD) graphs according to Examples 1 to 7, Comparative Example 1, and Reference Example 1.

Also, for the sample sulfide-based solid electrolyte, an X-ray diffraction (XRD: X-Ray Diffraction) graph was obtained by X-ray diffraction measurement using CuKα rays. FIG. 2 shows XRD graphs according to Examples 1 to 7, Comparative Example 1, and Reference Example 1. In the XRD graph, the intensity of "Intensity (a.u.)" represents an intensity of the X-ray detected by XRD measurement, and a.

u. is an abbreviation of arbitrary unit. In the XRD graph, "2θ" indicates an angle (diffraction angle) formed by a direction of incident X-ray and a direction of diffracted X-ray. Based on the XRD graph, whether or not the sample sulfide-based solid electrolyte had the argyrodite-type structure was evaluated by confirming the presence or absence of the diffraction peaks of the argyrodite-type structure.

Example 2

The procedure was carried out by the same method as that of Example 1, with the exception that the composition of the prepared sulfide-based solid electrolyte was $Li_8GeS_{5.375}Te_{0.625}$.

Example 3

The procedure was carried out by the same method as that of Example 1, with the exception that the composition of the prepared sulfide-based solid electrolyte was $Li_8GeS_{5.25}Te_{0.75}$.

Example 4

The procedure was carried out by the same method as that of Example 1, with the exception that the composition of the prepared sulfide-based solid electrolyte was $Li_8GeS_{5.125}Te_{0.875}$.

Example 5

The procedure was carried out by the same method as that of Example 1, with the exception that the composition of the prepared sulfide-based solid electrolyte was $Li_8GeS_{4.875}Te_{1.125}$.

Example 6

The procedure was carried out by the same method as that of Example 1, with the exception that the composition of the prepared sulfide-based solid electrolyte was $Li_8GeS_{4.75}Te_{1.25}$.

Example 7

The procedure was carried out by the same method as that of Example 1, with the exception that the composition of the prepared sulfide-based solid electrolyte was $Li_8GeS_{4.625}Te_{1.375}$.

Comparative Example 1

The procedure was carried out by the same method as that of Example 1, with the exception that the composition of the prepared sulfide-based solid electrolyte was $Li_8GeS_{5.625}Te_{0.375}$.

Reference Example 1

The procedure was carried out by the same method as that of Example 1, with the exception that the composition of the prepared sulfide-based solid electrolyte was $Li_8GeS_5Te$.

The above results are shown in Table 1.

TABLE 1

| | Ionic Conductivity of Solid Electrolyte (S/cm) |
|---|---|
| Example 1 | $3.0 \times 10^{-3}$ |
| Example 2 | $3.8 \times 10^{-3}$ |
| Example 3 | $3.4 \times 10^{-3}$ |
| Example 4 | $3.4 \times 10^{-3}$ |
| Example 5 | $3.1 \times 10^{-3}$ |
| Example 6 | $3.0 \times 10^{-3}$ |
| Example 7 | $2.8 \times 10^{-3}$ |
| Comparative Example 1 | $2.0 \times 10^{-3}$ |
| Reference Example 1 | $3.3 \times 10^{-3}$ |

(Evaluation Results)

In the XRD graphs of each of the solid electrolytes according to Examples 1 to 7 and Reference Example 1, strong diffraction peaks were confirmed at 2θ=24.3±1.0° and 28.7±1.0°, and each solid electrolytes had the argyrodite-type structure. In the XRD graph of the solid electrolyte according to Comparative Example 1, diffraction peaks as strong as those of Examples 1 to 7 and Reference Example 1 were not confirmed at 2θ=24.3±1.0° and 28.7±1.0°.

Further, each of the solid electrolytes according to Examples 1 to 7 and Reference Example 1 had the composition represented by the formula: $Li_8GeS_{5-x}Te_{1+x}$ in which: −0.5≤x<0, 0<x≤0.375. However, Comparative Example 1 did not have the composition.

Therefore, the solid electrolytes according to Examples 1 to 7 and Reference Example 1 had better ion conductivity than that of Comparative Example 1 which did not have the argyrodite-type structure and did not have the above composition. Therefore, the improvement of the battery capacity of the all-solid lithium ion batteries using the solid electrolytes according to Examples 1 to 7 and Reference Example 1 can be expected.

The invention claimed is:

1. A sulfide-based solid electrolyte having an argyrodite-type structure, wherein a composition of the sulfide-based solid electrolyte is represented by the formula:

$Li_8GeS_{5-x}Te_{1+x}$ in which: −0.5≤x<0, 0<x≤0.375.

2. The sulfide-based solid electrolyte according claim 1, wherein the sulfide-based solid electrolyte satisfies −0.375≤x<0 in the formula.

3. An all-solid lithium ion battery comprising: a solid electrolyte layer made of the sulfide-based solid electrolyte according to claim 1; a positive electrode layer; and a negative electrode layer.

4. An all-solid lithium ion battery comprising: a solid electrolyte layer made of the sulfide-based solid electrolyte according to claim 2; a positive electrode layer; and a negative electrode layer.

* * * * *